May 18, 1926.
W. BEUSCH
1,585,326
MEASURING DEVICE IN THE CONNECTING LINE BETWEEN TWO ELECTRIC
POWER STATIONS WORKING IN PARALLEL
Filed August 20, 1924
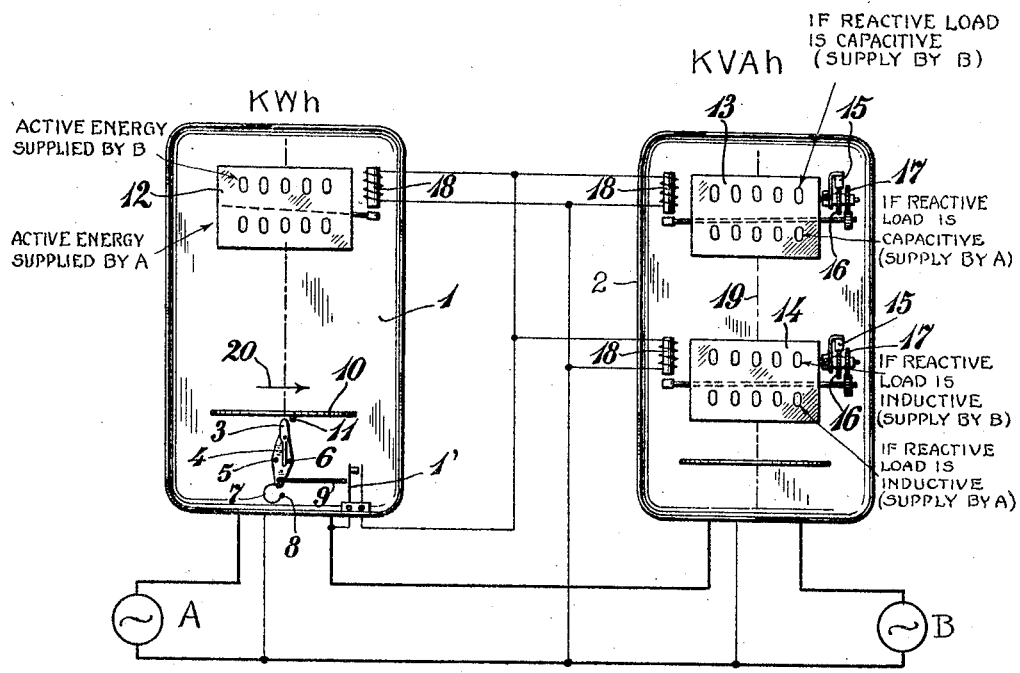
Inventor:
Willi Beusch
By B Singer, Atty.

Patented May 18, 1926.

1,585,326

UNITED STATES PATENT OFFICE.

WILLI BEUSCH, OF ZUG, SWITZERLAND, ASSIGNOR TO LANDIS & GYR S. A., OF ZUG, SWITZERLAND, A SWISS FIRM.

MEASURING DEVICE IN THE CONNECTING LINE BETWEEN TWO ELECTRIC POWER STATIONS WORKING IN PARALLEL.

Application filed August 20, 1924. Serial No. 733,235.

For the complete measurement of the effective and reactive energy exchanged between two power stations, six counting trains are usually necessary, of which two are fitted to watthour meters and the other four are fitted to reactive meters. The two watthour meter counting trains serve to register the useful energy supplied to or withdrawn from the system. Two of the reactive meter counting trains record the inductive energy and the other two counting trains the capacitive reactive energy during the supply of withdrawal.

The arrangement is usually such that several watthour meters and several reactive meters are employed.

The object of the present invention is to effect this measurement with the aid of two meters only, one of the meters being a watthour meter and the other a reactive meter.

The watthour meter is provided with a double counting train and the reactive meter is fitted with two double counting trains. The double counting train of the watthour meter must be so arranged that the revolutions of the meter disc are registered on one or other of the two series of figure rolls of this counting train according to the sense of rotation of the meter disc. The two double counting trains in the reactive meter also register according to the sense of rotation of the meter disc, one counting train registering, for example, when the disc when viewed from the front of the meter rotates from left to right, and the other counting train registering when the disc rotates in the opposite direction. Both counting trains are changed-over so that the energy is registered on the upper sets of figure rolls, when the direction of rotation of the watthour meter is reversed. This change-over is effected by an electrical relay controlled by a contact in the watthour meter. This contact is closed when the direction of rotation of the watthour meter changes, i. e. when the flow of energy in the connecting lines between the two power stations is reversed. The accompanying drawing is a diagrammatic elevation of measuring apparatus constructed and arranged in accordance with this invention. In the example of construction diagrammatically represented, a measuring group is shown connected in a single-phase line connecting two power stations working in parallel. In this line are included a watthour meter 1 and a reactive meter 2. The watthour meter 1 is fitted with a contact device 1' controlled by a pawl device. This pawl device comprises a pawl 3 having an arm acting as a counterpoise and an operating lever 4. The latter, which is rotatable about the point of attachment of the pawl 3, is provided with two stop pins 5, 6 and is under the action of a spring 7 secured in the meter at the point 8. A push rod 9 is hinged to the operating lever 4. On the driving disc 10 of the watthour meter is mounted a stop 11, 12 is the double counting train in the watthour meter, and 13, 14 are the two double counting trains in the reactive meter. Each of the latter is provided with a pawl clutch 15 acting on a ratchet wheel 16. The ratchet wheel 16 is rigidly attached to a toothed wheel 17, and, together with same, rides loosely on a shaft driven by the meter.

Each of the rocking shafts of the three counting trains is under the action of one of the relays 18 which are connected to the mains through the contact device 1'. In the example of construction described, the pawl clutches 15 all act in the same direction and one of the worms transmitting the drive from the main spindle 19 to the two counting trains 13, 14 is right-handed and the other of these worms is left-handed.

The operation of the metering equipment described is as follows:—

Assuming that the energy flows from left to right and that the reactive energy is inductive, the watthour meter will rotate from left to right, i. e. in the direction of the arrow 20. The reactive meter will rotate in the same direction. The relays 18 are not energized and thus all the counting trains are connected to the lower set of figure rolls. Thus, the lower set of figure rolls in the watthour meter and the lower set of figure rolls of the lower counting train 14 in the reactive meter register. Should the reactive load now become capacitive, the direction of rotation of the reactive meter would be reversed, i. e. the lower set of figure rolls of the upper double counting train 13 of this meter would register. If, now, with this state of reactive load the direction of flow of the useful or active energy were to change, the sense of rotation of the watthour meter would be reversed and the contact 1 would be closed. At the same time, all the relays 18 of the three double counting trains would be energized and the counting trains changed-over to the upper sets of figure rolls. In this manner, the useful or active energy would be registered on the upper set of figure rolls in the watthour meter and the capacitive reactive energy would be registered on the upper set of figure rolls of the double counting train 13 in the reactive meter. Summarizing one may say:—

The lower set of figure rolls of the double counting train in the watthour meter registers the useful or active energy supplied, whilst the upper set of figure rolls measures the active energy withdrawn. The lower counting train in the reactive meter registers the inductive reactive energy, the lower set of figure rolls registering the energy which loads the left hand power station, when useful or active energy is supplied, and the upper set of figure rolls registering the energy when useful or active energy is withdrawn. The upper double counting train in the reactive meter measures the capacitive reactive energy, the lower set of figure rolls measuring the energy passing during supply, and the upper that which is present during withdrawal.

For the sake of simplicity, the measuring equipment has only been shown as applied to a single-phase line. It is obvious, however, that this measuring arrangement can also be applied to polyphase connecting lines.

The contact device 1' could also be combined with the counting train 12. Moreover, the changeover of these counting trains could also be effected mechanically.

The pawl clutches 15 could also work in opposite directions, in which case, however, the worms on the main spindle would both be cut in the same direction and one of the counting trains could also be provided with an additional transmission gear.

What I wish to secure by Letters Patent is:—

1. A measuring device in the connecting line between two power stations working in parallel, comprising one watthour meter and one reactive meter, said watthour meter having one double counting train and said reactive meter having two double counting trains, of which double counting trains each of the latter registers according to one direction of rotation, and means which change over both the double counting train in the watthour meter and the two double counting trains in the reactive meter when the direction of rotation of the watthour meter changes.

2. A measuring device in the connecting line between two power stations working in parallel, comprising one watthour meter and one reactive meter, said watthour meter having one double counting train and said reactive meter having two double counting trains, of which double counting trains each of the latter registers according to one direction of rotation, a pawl device and a contact device in the watthour meter, and three relays, each of which acts on one of the double counting trains, said pawl device influencing the contact device according to the direction of rotation of the spindle of the watthour meter, and said contact device acting on the relays.

3. A measuring device in the connecting line between two power station working in parallel, comprising one watthour meter and one reactive meter said watthour meter having one double counting train and said reactive meter having two double counting trains, of which double counting trains each of the latter registers according to one direction of rotation of the spindle of the reactive meter, a pawl device in each of the double counting trains in the reactive meter, of which pawl devices one puts its double counting train out of operation when the driving disc of the reactive meter rotates in one direction and the other pawl device puts its double counting train out of operation when the said driving disc rotates in the opposite direction.

In witness whereof I affix my signature.

WILLI BEUSCH.